Dec. 24, 1929.  W. W. HARTMAN  1,740,590
TOOL FOR PLACING OR REMOVING PISTON PIN RETAINING RINGS
Filed Oct. 26, 1928
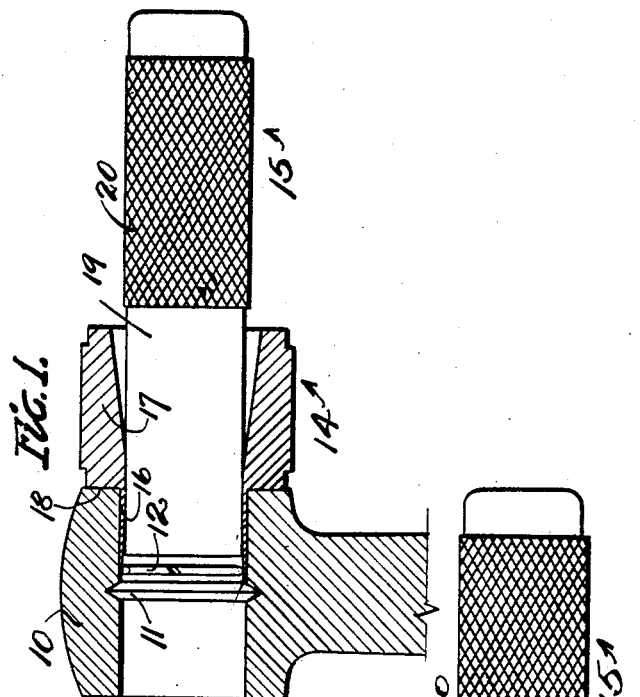
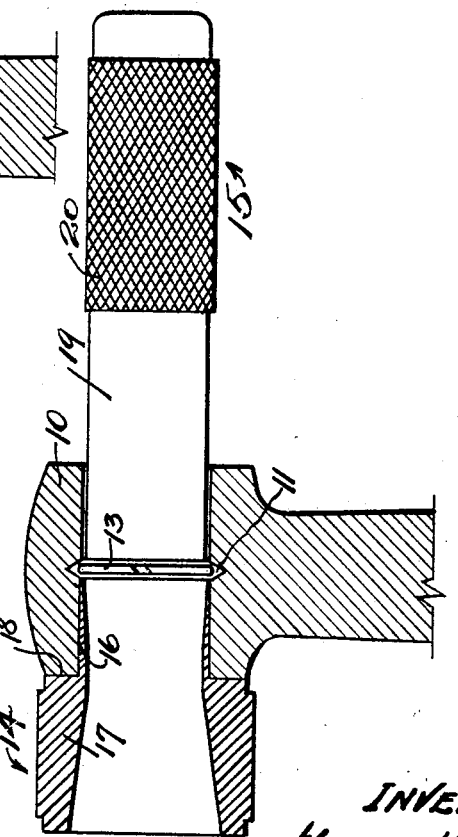
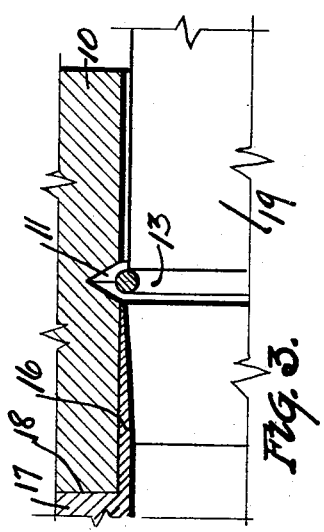
INVENTOR
WILLIAM W. HARTMAN
by J H Weatherford
ATTORNEY.

Patented Dec. 24, 1929

1,740,590

UNITED STATES PATENT OFFICE

WILLIAM W. HARTMAN, OF MEMPHIS, TENNESSEE

TOOL FOR PLACING OR REMOVING PISTON-PIN RETAINING RINGS

Application filed October 26, 1928. Serial No. 315,292.

This invention relates to improvements in tools for placing piston-pin retaining rings in, and removing them from, connecting rod ends or the like.

In modern automobile practice, the pins are in many cases retained in the piston end of the connecting rod by an annular ring ordinarily made of spring steel wire, this ring having a gap at one side so that it may be reduced in diameter to insert it in a groove prepared for it in the connecting rod end, and also that it may be sprung apart in such groove during the insertion of the piston-pin. The present tool is for the double purpose of inserting such a ring in a connecting rod end and also for the purpose of removing a ring which is already in place.

The objects of this invention are:

(a) To provide means for closing the ring to reduce the diameter thereof, holding the ring so closed and inserting it in the rod end adjacent the groove, and thereafter releasing it into the groove;

(b) To provide means for forcing a ring already in place out of the groove and into a holder and thereafter removing the holder and ring.

The means by which I accomplish these objects and the manner of their accomplishment will readily be understood from the following specification, on reference to the accompanying drawings, in which:

Fig. 1, is a sectional elevation taken on the axial center line of a connecting rod end, with the holder inserted therein and the retaining ring in place in the holder ready to be sprung into the rod groove.

Fig. 2, is a similar sectional elevation showing the holder in position for removing the ring from the groove and with the ring in the groove.

Fig. 3, is an enlarged fragmentary detail showing portions of the ring, groove, and holder in the same position as shown in Fig. 2.

Referring now to the drawings in which the various parts are indicated by numerals, 10 is a connecting rod end, having an annular groove 11 therein. 12 is a retaining ring which is to be placed in the groove and 13 is a similar ring in place in the groove ready for removal.

The tool comprises two parts 14 and 15, which will be hereinafter designated as a ring holder and a plunger respectively. The ring holder comprises a hollow cylindrical retainer portion 16 the exterior of which fits the bore of the rod end as closely as possible without binding therein. This retainer 16 is integral with a handle portion 17 of larger size and preferably though not necessarily cylindrical. The shoulder 18 where the portions 16 and 17 join is preferably exactly at right angles to the surface of the retainer 16. The length of the retainer 16 from the shoulder 18 to the outer end thereof, is substantially equal to the distance from one of the faces of the rod end 10 to the near edge of the groove 11 therein, so that when the retainer is placed within the bore of the rod end the extreme end of the retainer will come very closely adjacent, if not exactly to the nearest groove edge.

The adjacent portions of the handle and retainer have a cylindrical bore slightly smaller than the exterior diameter of the retainer so that the retainer is a thin shell even at this point, this shell ordinarily being about $\frac{1}{32}$ inch thick. From this cylindrical portion the bore of the retainer enlarges so that at its outer end the retainer is quite thin. The bore of the handle is enlarged toward its end along substantially conical lines so that at the end of the handle this bore is large enough to receive loosely one of the retaining rings. The plunger 15 comprises a cylindrical portion 19 loosely fitting the cylindrical portion of the bore of the holder portion, and an integral handle portion 20 preferably knurled as shown.

In using the device to place a retaining ring in the rod end; the ring is dropped into the handle bore and is pushed down therein by the plunger, and into the retainer. The retainer is then inserted in the bore of the rod end until the shoulder 18 bottoms, and the ring pushed out by the plunger into groove, in which groove it expands sufficiently to hold it in place. The tool is then removed as the operation is complete.

To remove a ring from the connecting rod end the retainer is inserted as before into the bore of the rod end until the shoulder bottoms. The plunger is then inserted in the bore of the rod end from the opposite direction and the ring pushed against the further side of the groove. This action causes the ring to center in the groove, further pressure compresses it and forces it out of the groove into the adjacent end of the retainer, in and by which it may then be removed.

It will be noted that the ring does not have to slide on any portion of the bore of the rod end, either in being placed or in being removed, and that therefore the ring may be placed or removed without scoring this bore. It will be understood that at times the two ends of the ring wire are rough and that in such cases scoring is not only a possibility, but a probability, which by this tool is done away with.

Having described my invention, what I claim is:

1. A tool for placing or removing split retaining rings in connecting rod ends which have a ring retaining groove therein, comprising a ring holder and a plunger; said holder comprising a handle and an integral ring-retainer having a continuous bore therethrough, said retainer being cylindrical, of a diameter closely fitting the bore of said rod end, and extending from said handle a distance approximately equal to the distance from the end of the rod bore to the nearer edge of the groove therein, the outer end of said retainer bore being of such diameter as to leave only a thin shell therearound, and the outer end of the handle bore being of greater diameter than the normal diameter of the said ring and reducing in diameter to meet the diameter of said retainer bore; said plunger having a cylindrical portion adapted to be inserted through the bore of said retainer and substantially fitting the smaller portion of the bore thereof; whereby said handle portion may be used to push a retaining ring into and/or through said retainer portion in replacing or removing said ring from a connecting rod end.

2. A tool for removing or replacing split retaining rings in connecting rod ends, which ends are provided with a groove for the reception of the ring, said tool comprising a hollow cylindrical ring-retainer adapted to closely fit the bore of the rod end, and being of a length substantially equal to the distance from the end of the rod end bore to the nearer edge of the ring groove, and the shell of said retainer being quite thin at the end thereof, and a handle, larger than said retainer, integral therewith, whereby a shoulder is formed to limit the entrance of said retainer into said rod end bore, said handle having a communicating bore increasing in size, from said retainer bore toward the end of said handle, to a greater diameter than the normal diameter of said retaining ring; and a cylindrical plunger part adapted to co-operate with said retainer part in placing or removing a ring.

3. A tool for placing or removing split retaining rings in connecting rod ends which have a ring retaining groove therein, said tool comprising a ring holder and a plunger; said holder comprising a handle and an integral ring-retainer having a continuous bore therethrough, said retainer being a thin annular shell, of a diameter closely fitting the bore of said rod end, and extending from said handle a distance approximately equal to the distance from the end of the rod bore to the nearer edge of the groove therein, the outer end of the handle bore being of greater diameter than the normal diameter of the retaining ring and reducing in diameter to meet the bore of said retainer; said plunger part having a cylindrical portion adapted to be inserted through the bore of said retainer part and substantially fitting the smaller portion of the bore thereof, and adapted to co-operate with said holder in placing or removing a ring.

4. A tool for removing or replacing split retaining rings in connecting rod ends, which ends are provided with a groove for the reception of the ring, said tool comprising a thin annular shell adapted to closely fit the bore of the rod end and a handle portion, larger than said holder portion, integral therewith whereby a shoulder is formed to limit the entrance of said shell into said rod end bore, said handle having a communicating bore increasing in size from said shell toward the end thereof, to a diameter greater than the normal diameter of said retaining ring; and a cylindrical plunger adapted to co-operate with said retainer part in placing or removing a ring.

5. A tool for placing or removing split retaining rings in connecting rod ends which have a ring retaining groove therein, said tool comprising a ring-holder and a plunger; said holder comprising a handle and an integral retainer portion having a continuous bore therethrough, said retainer being a thin annular shell closely fitting the bore of said rod end and limited in length by said handle portion, the outer end of the handle portion bore being of greater diameter than the normal diameter of said retaining rings and reducing in diameter to meet the bore of said shell; said plunger part having a cylindrical portion adapted to be inserted through the bore of said shell and substantially fitting the bore thereof; whereby said handle portion may be used to push a retaining ring into and/or through said shell in replacing or removing said ring from a connecting rod end.

In testimony whereof I hereunto affix my signature.

WILLIAM W. HARTMAN.